(12) United States Patent  
Miura et al.

(10) Patent No.: US 6,698,097 B1
(45) Date of Patent: Mar. 2, 2004

(54) METHOD FOR MANUFACTURING A TOOL THAT IS USED TO FORM DYNAMIC PRESSURE GENERATING GROOVES IN DYNAMIC PRESSURE BEARING DEVICES

(75) Inventors: Kazushi Miura, Nagano (JP); Masato Gomyo, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/543,308

(22) Filed: Apr. 5, 2000

(30) Foreign Application Priority Data

May 6, 1999 (JP) .............................. 11-126325

(51) Int. Cl.$^7$ ..................... F16C 32/06; B23K 15/08; B44C 1/22
(52) U.S. Cl. ..................... 29/898.02; 216/43; 216/94; 219/121.19; 219/121.2; 219/121.68; 219/121.69
(58) Field of Search ................. 29/898.02, DIG. 16; 216/43, 94; 384/123; 72/54, 55, 352, 353.2, 470; 219/121.19, 121.2, 121.68, 121.69

(56) References Cited

U.S. PATENT DOCUMENTS

| 3,659,324 A | * | 5/1972 | Murray |
| 4,157,465 A | * | 6/1979 | Beardmore et al. |
| 5,273,368 A | | 12/1993 | Asada et al. |
| 5,399,141 A | * | 3/1995 | Takahashi |
| 5,407,281 A | | 4/1995 | Chen |
| 5,427,456 A | | 6/1995 | Hensel |
| 5,558,445 A | | 9/1996 | Chen et al. |
| 5,628,568 A | | 5/1997 | Takahashi et al. |
| 5,634,724 A | | 6/1997 | Zang et al. |
| 5,683,183 A | | 11/1997 | Tanaka et al. |
| 6,010,246 A | | 1/2000 | Gomyo et al. |
| 6,200,035 B1 | * | 3/2001 | Otsuki |

FOREIGN PATENT DOCUMENTS

| JP | 57-046890 | * | 3/1982 |
| JP | 03-071944 | * | 3/1991 |
| JP | 04-282017 | * | 10/1992 |
| JP | 06-010148 | * | 1/1994 |
| JP | 06-063781 | * | 3/1994 |

* cited by examiner

*Primary Examiner*—Gregory Vidovich
*Assistant Examiner*—Eric Compton
(74) *Attorney, Agent, or Firm*—Reed Smith LLP

(57) ABSTRACT

A method for manufacturing a tool to form a dynamic pressure bearing in which at least one of the bearing surfaces has a plurality of pressure generating grooves defined by projections and in which lubricating fluid is contained in the grooves to provide lubrication between the bearing surfaces when they rotate relative to one another. A flat bevel is created at one or more of the corners of each of the projections that define the grooves thereby generating a wedge-shaped space that communicates between the grooves and the gap between the bearing surfaces. This wedge-shaped space facilitates passage of lubricating fluid from the groove to the gap when movement, normally rotation, occurs between the two bearing surfaces thereby minimizing wear between the surfaces.

6 Claims, 14 Drawing Sheets

PRIOR ART

METHOD FOR MANUFACTURING A TOOL THAT IS USED TO FORM DYNAMIC PRESSURE GENERATING GROOVES IN DYNAMIC PRESSURE BEARING DEVICES

BACKGROUND OF THE INVENTION

The present invention relates to a dynamic pressure bearing apparatus and a method for manufacturing thereof and to a tool for forming a dynamic pressure generating groove in the apparatus and a method for manufacturing the groove, in which a dynamic pressure is generated in a lubricating fluid wherein a fixed member and a rotatable member hold each other relatively rotatable due to the dynamic pressure.

Various suggestions have been made regarding a dynamic pressure bearing apparatus holding various rotating bodies, such as a polygon mirror, a magnetic disc and an optical disc, while rotating at a high speed. In such a dynamic pressure bearing apparatus, a dynamic pressure bearing surface on the side of a fixed member is placed to face a dynamic pressure bearing surface on the side of a rotatable member with a narrow space or gap in which a dynamic pressure bearing portion is formed. Also, dynamic pressure generating grooves are formed on at least one of the dynamic pressure bearing surfaces wherein a lubricating fluid inserted in the dynamic pressure bearing portion, such as air and oil, is pressurized by a pumping effect generated by the dynamic pressure generating grooves during rotation such that the fixed member and the rotatable member are rotatably held thereat without contacting each other due to the dynamic pressure of the lubricating fluid.

The dynamic pressure bearing grooves are formed as a concavity extending on the dynamic pressure bearing surfaces in a shape of a spiral or a herringbone. A projecting portion, as the rest of the space on the dynamic pressure bearing surfaces, comprises a projecting surface. When the rotatable member is not in rotation, the fixed member and the rotatable member are in contact with each other wherein the lubricating fluid is held inside the dynamic pressure generating grooves. Once relative rotation of the rotatable member and the fixed member starts, the lubricating fluid in each of the dynamic pressure generating grooves flows towards a specific pressure point and generates a dynamic pressure by confluence thereof to provide a given floating power.

As described above, in an ordinary dynamic pressure bearing apparatus, it takes a period of time to obtain a given floating power by a dynamic pressure after rotation starts; in other words there is a period of time at the beginning of the rotation when there is no dynamic pressure in the lubricating fluid. Therefore, the fixed member and the rotatable member rub each other while being in contact during the above period of time. As a result, abrasion of the members progresses in the early stage of their life, resulting in life shorter than expected.

Such an issue becomes noticeable when original surface 2' (indicated as a dotted line), as shown as a thrust dynamic pressure bearing surface in FIG. 17, is flattened to increase flatness of projecting portion 2, comprising a projecting surface as the remains area thereat other than dynamic pressure generating groove 1. In other words, projecting portion 2 after the flattening treatment has its surface slightly lower than original surface 2'; then, the opening edge of dynamic pressure generating groove 1 is pushed inward by the difference in the height. As a result, reverse tapering portion 1b starts from the bottom of the side wall of the groove. Such reverse tapering portion 1b tends to keep back the lubricating fluid which tries to flow out from dynamic pressure generating groove 1 towards projecting portion 2; especially, when rotation has just started, the time period without the lubricating fluid on the side of projecting portion 2 is further extended such that abrasion of the fixed member and the rotatable member is significantly increased.

Hence, a purpose of the present invention is to provide a dynamic pressure bearing apparatus, which has a simple configuration wherein abrasion of a fixed member and a rotatable member is decreased, and a method for manufacturing thereof and a tool for forming a dynamic pressure generating groove used therewith and a method for manufacturing thereof.

BRIEF DESCRIPTION

In brief, the dynamic pressure bearing has first and second facing bearing surfaces having a gap between them. Typically, one of these bearing surfaces might be the surface of a shaft of a motor and the other bearing surface might be the cylindrical bearing portion of the stator of the motor. As is known in the art, a plurality of pressure generating grooves are formed on one of the two bearing surfaces. These grooves contain lubricating fluid. When the rotor rotates, these grooves tend to pump fluid into the gap between the two bearing surfaces. Thus the fluid flows from the grooves to the space between the top of the projections that define the grooves and the opposed surface. It is the top of the projections which bear most of the load. In order to enhance the flow of the lubricating fluid into the zone adjacent to the top of the projections, a beveled surface is provided at each corner of the projections. This bevel provides a wedge-shaped space that enhances lubricating fluid flow from the grooves to the gap.

DESCRIPTION OF THE PREFERRED EMBODIMENT

The following describes an embodiment of a spindle motor having a thrust dynamic pressure bearing according to the present invention in reference to drawings.

Figure 1:
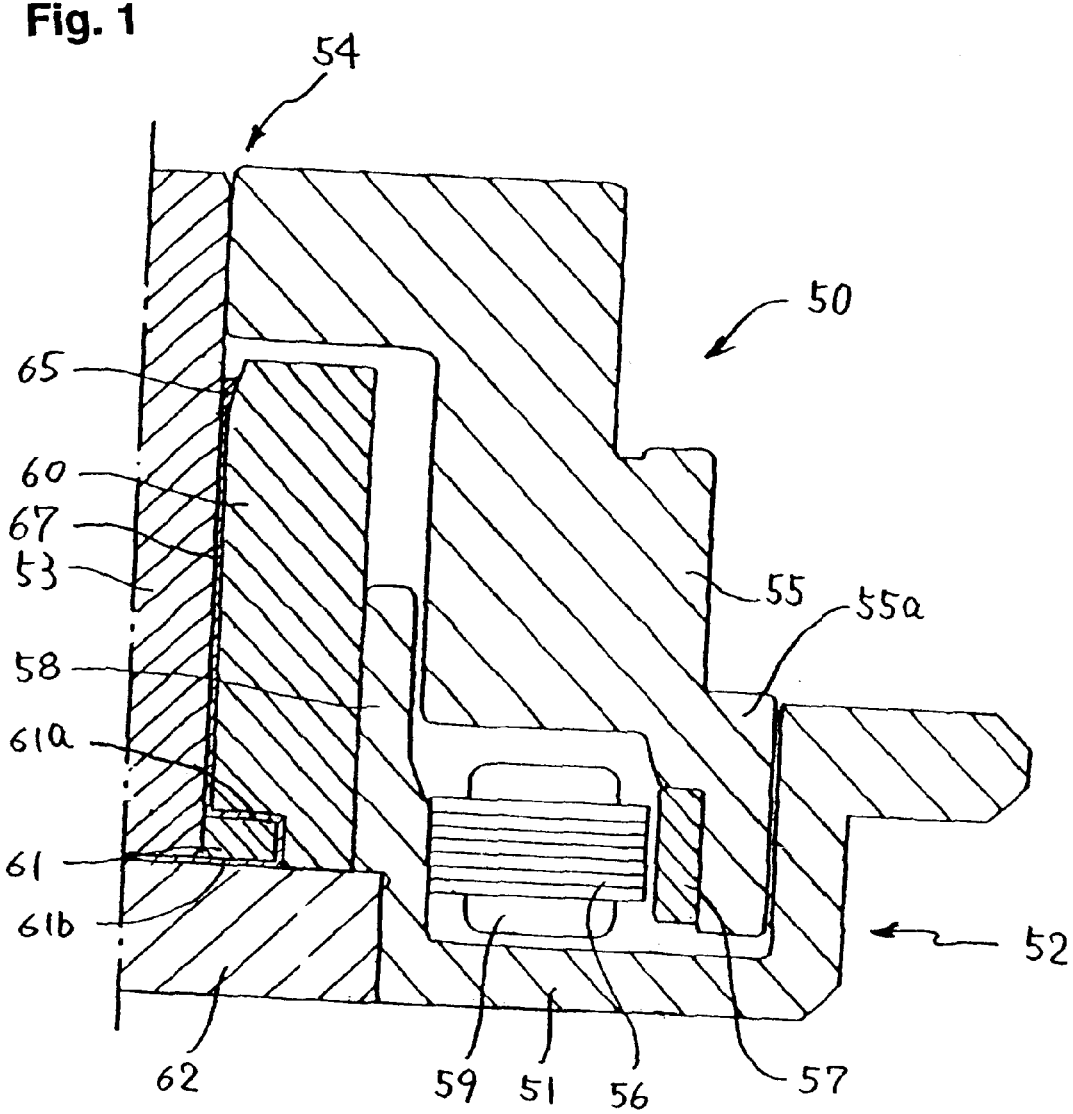
FIG. 1 is a cross section of a dynamic pressure bearing motor with a rotatable shaft according to the present invention.

FIG. 1 shows a cross section of dynamic pressure bearing motor 50 with a rotatable shaft. Motor 50 is configured mainly of: fixed member 52, which is assembled on frame 51 formed of an aluminum material; and rotatable member 54 which rotates around rotatable shaft 53 in relation to fixed member 52. Hub 55 is mounted at the upper end of rotatable member 54 to hold a disc. Also, the inner surface of outer cylindrical portion 55a of hub 55 has drive magnet 57 facing stator core 56. Additionally, fixed member 52 comprises: frame 51; cylindrical holder 58 which is formed integrally with frame 51; stator core 56 around which coil 59 is wound and which is fixed to the outer surface of holder 58; cylindrical bearing 60 which is fixed to the inner surface of holder 58 and which holds rotatable shaft 53 rotatably; and counter plate 62 which is fixed to the opening of holder 58.

A dynamic pressure generating groove portion is formed on at least one of the inner surface of bearing 60 and the outer surface of rotatable shaft 53; the dynamic pressure generating groove portion configures radial dynamic pressure bearing portion 67. Also, disc-shaped thrust plate 61 is engaged to the bottom end of rotatable shaft 53. Thrust plate 61 is placed between the bottom of bearing 60 and the top surface of counter plate 62. Additionally, each end surface of thrust plate 61 in the axial direction has a dynamic pressure generating groove portion which configures thrust dynamic pressure bearing portions 61a, 61b. The dynamic pressure generating portion needs to be formed on only one of end surfaces of thrust plate 61 in the axial direction; also, the dynamic pressure generating groove portion can be formed on the top surface of counter plate 62 or the bottom surface of bearing 60, both of which face an end surface of thrust plate 61 in the axial direction.

Lubricating fluid 65 fills radial dynamic pressure bearing portion 67 and thrust dynamic pressure bearing portions 61a, 61b. Therefore, when rotatable member 54 rotates, the outer surface of rotatable shaft 53 and the inner surface of bearing 60 are not in contact with each other having lubricating fluid 65 therebetween, as well as at the end surfaces of thrust plate 61 in the axial direction, the top surface of counter plate 62 and the bottom surface of bearing 60.

In this embodiment, the inner surface of bearing 60, the bottom surface of bearing 60, and the top surface of counter plate 62 are a part of fixed member 52 wherein a dynamic pressure bearing portion formed of these surfaces is called the first dynamic pressure bearing surface. Also, the outer surface of rotatable shaft 53 and both end surfaces of thrust plate 61 in the axial direction are a part of rotatable member 54 wherein a dynamic pressure bearing portion formed of these surfaces is called the second dynamic pressure bearing surface.

Figure 2:
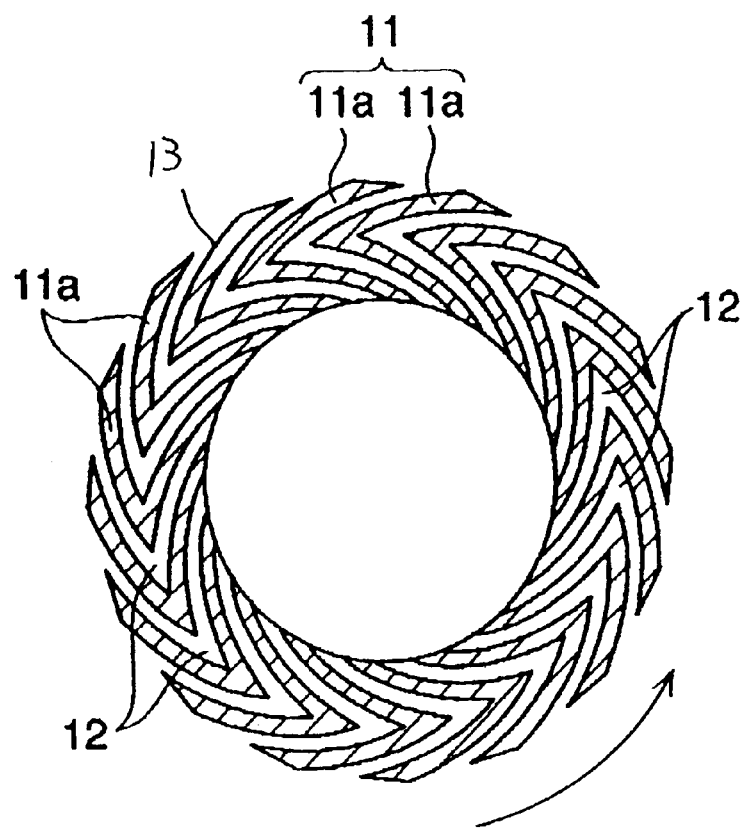
FIG. 2 is a plan view showing the entire configuration of a dynamic pressure generating groove formed at a thrust plate.

FIG. 2 shows an example of thrust dynamic pressure generating groove 11 according to the present invention. This thrust dynamic pressure generating groove 11 is formed on at least one of fixed member 52 and rotatable member 54, which are placed to be rotatable in relation to each other; such a groove, for example, can be formed on a dynamic pressure bearing surface of thrust plate 61 and is shaped as a herringbone wherein a plurality of V-shaped groove portions 11a are lined in the circumferential direction. In each of groove portions 11a, the lubricating fluid flows from both ends towards the summit of the V such that given dynamic pressure is generated by the pressure at the summit. Also, the area of the dynamic pressure bearing surface other than thrust dynamic pressure generating groove 11 is projecting portion 12 having a projecting surface.

Figure 3:
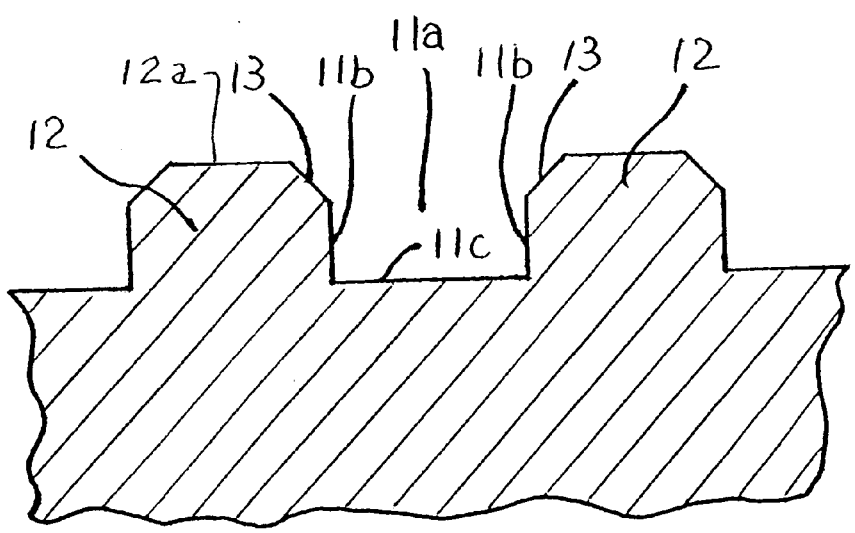
FIG. 3 is a cross section of the dynamic pressure generating groove formed at the thrust plate in the direction perpendicular to the length of the groove.
Figure 4:
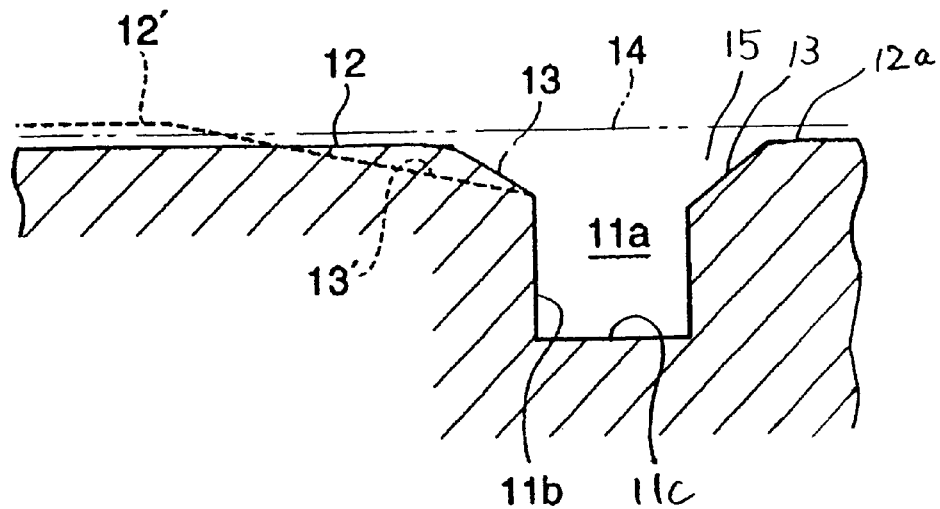
FIG. 4 is an enlarged partial cross section of FIG. 3.

Dynamic pressure generating groove 11 and projecting portion 12 are formed to have a cross section as shown in FIGS. 3 and 4. In other words, groove portion 11a of dynamic pressure generating groove 11 is shaped as an approximate rectangular in a cross section thereof in a direction perpendicular to the length of the groove. Slanted guide surfaces 13 are formed on facing edges of dynamic pressure generating groove 11, as opening edges thereof. Slanted guide surface 13 is formed as a connection between side wall 11b of dynamic pressure generating groove 11 and projecting surface 12a of projecting portion 12; also, it extends at a given angle in relation to projecting surface 12a of projecting portion 12. Slanted guide surfaces 13 provides a shape of the opening of dynamic pressure generating groove 11 to expand outwards (upward in the figures). Therefore, groove portion 11a of dynamic pressure generating groove 11 is configured of: bottom 11c; side walls 11b which stand almost perpendicular to bottom 11c; and slanted guide surfaces 13. Slanted guide surface 13 may be formed only on the side of the opening edge of dynamic pressure generating groove 11 from which the lubricating fluid flows during rotation, or on both sides of the opening as shown in FIG. 3. In reference to FIGS. 2 and 3, the side from which the lubricating fluid flows during rotation is defined as the opening edge of dynamic pressure generating groove 11 on the downstream of the lubricating fluid which moves counterclockwise as indicated by an arrow in FIG. 2 when the fixed member and the rotatable member rotates respectively; in other words, it is the side of V-shaped dynamic pressure generating groove 11 on the downstream. In FIG. 3, when the lubricating fluid moves from the right to the left, for example, it is preferable to form slanted guide surface 13 on at least the right side of the facing edges of groove 11a. This slanted guide surface 13 is a flat bevel which provides a wedge-shaped space 15 that provides communication between the fluid holding grooves and the gap between the flat bearing surface 12a and the opposing bearing surface.

Dynamic pressure generating groove 11 and projecting portion 12 in this embodiment are formed by performing a coining treatment to a blank of a thrust plate. The projecting surface of projecting portion 12' right after the coining treatment, as indicated with a dotted line in FIG. 4, is slightly higher than final surface 12 indicated with a solid line. Also, original shape 13' of slanted guide surface 13 right after the coining treatment is a relatively gentle slope. Then, flattening treatment is performed to the projecting surface of projecting portion 12' right after the coining treatment, as indicated with a dotted line, from the top of the figure; as a result, final projecting portion 12, which is slightly squished down, is excellently flattened. In this case, slanted guide surface 13 has a slope sharper than original shape 13' by the amount of projecting portion 12 squished down by the flattening treatment.

When rotatable member 54 stops, opposing member 14 comes into contact with projecting surface 12a of projecting portion 12 on a thrust dynamic pressure bearing formed on a thrust plate. Wedge-shaped space 15 is formed between slanted guide surface 13 and opposing member 14 (indicated with a two-dotted line in FIG. 4: for example, it is bearing 60 or counter plate 62). Therefore, the lubricating fluid in dynamic pressure generating groove 11 when rotation is suspended immediately flows out via slanted guide surface 13 on the opening edge of dynamic pressure generating groove 11 toward projecting portion 12; then, it swiftly flows between fixed member 52 and rotatable member 54 due to the wedge effect of slanted guide surface 13 to form a film. As a result, a contact between fixed member 52 and rotatable member 54 is prevented right after rotation starts such that abrasion of the members can be minimized.

With reference to FIG. 3, the following dimensions are provided in one specific preferred embodiment. The width of the groove 11 and of the projection 12 are essentially the same and are each equal to 0.35 mm. The full height of the projection is 0.009 mm. However, the perpendicular sidewalls 11b are 0.0075 mm. The coined flat top portion 12a of the projection 12 is 0.15 mm. The bevel 13 is at an acute angle of 6 degrees to the horizontal. The flat bevel 13 is a hypotenuse of a right triangle having a height of 0.0015 mm and a length of 0.1 mm. This means that the two bevels 13 constitute approximately 35% of the width of the projection 12. It is preferred that the upper flat bearing portion 12a of the projection be over fifty percent of the total width of the projection 12.

It should be noted that the size of the grooves 11 and projections 12 vary appreciably from application to application and have a typical range from 0.2 mm to 0.5 mm with consequent proportionate variations in the dimensions of the bevel 13.

Figure 5:
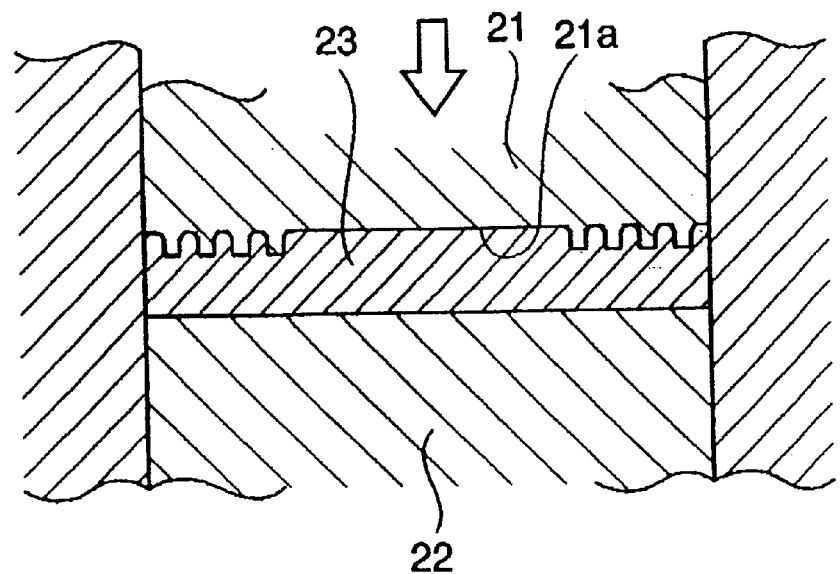
FIG. 5 is a longitudinal section showing an example of a coining processing apparatus to manufacture the thrust plate.

Dynamic pressure generating groove 11, projecting portion 12 and slanted guide surface 13, together forming a thrust dynamic pressure bearing, are formed by a coining treatment apparatus comprising coining punch 21 made of a hard metal material as shown in FIG. 5. Coining punch 21 is mounted on fixed die 22 to be movable in the vertical direction, end portion 21a on the bottom of coining punch 21 is pressed against blank 23 of a thrust plate, which is set on fixed die 22 as a work piece, such that a pattern is transferred thereto. End portion 21a of coining punch 21 has a corrugation which is a reverse pattern of dynamic pressure generating groove 11, projecting portion 12 and slanted guide surface 13; the corrugation is is transferred to the blank of the thrust dynamic pressure bearing. Projecting portion 12 and slanted guide surface 13 are formed precisely with, a corrugation having a reverse shape of shapes 12' and 13' in FIG. 14; especially, the section of coining punch 21 forming slanted guide surface 13 has, as indicated with a dotted line 13', a slope less steep than the angle of the slope of final slanted guide surface 13.

Figure 6:
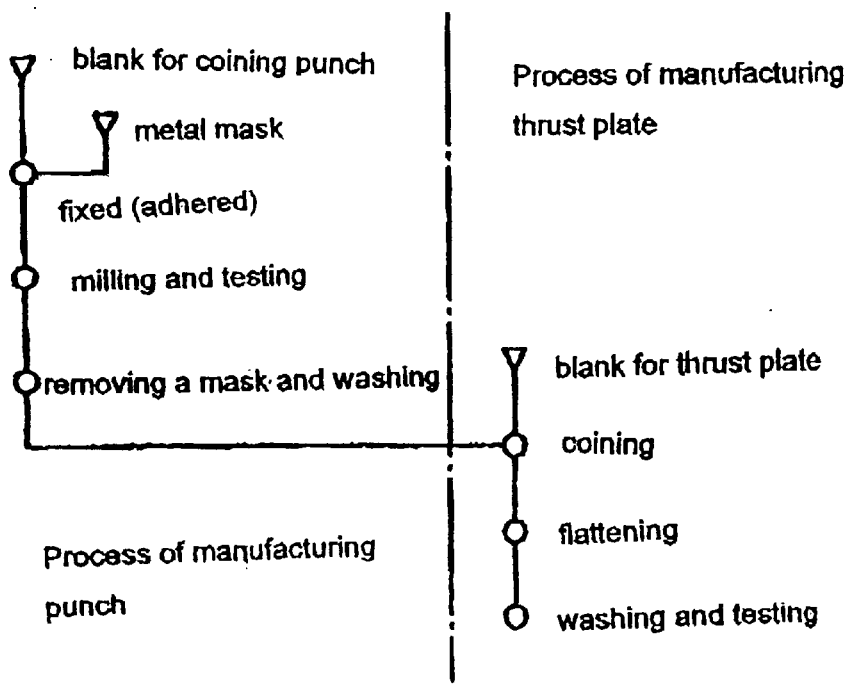
FIG. 6 is a flow chart showing a method of manufacturing a coining punch and a thrust plate using the same.

The coining treatment using coining punch 21 is performed to a blank of the thrust plate as shown at the right in FIG. 6. End portion 21a of coining punch 21 forms the above thrust dynamic pressure bearing surface readily and precisely; hence, the coining treatment dramatically improves efficiency in production compared to an etching treatment, cutting treatment, plating treatment and the like. After the coining treatment, a flattening treatment is performed, and the formation of the groove portion is completed after washing and test processes.

As described above, coining punch 21 comprises a projecting portion for forming a groove and a concave portion for forming a projecting surface having a reverse shape of dynamic pressure generating groove 11, projecting portion 12' and slanted guide surface 13'. The concave portion for forming a projecting surface of the corrugation can be efficiently formed by using an ion-milling apparatus as described in the following.

As shown on the left in FIG. 6, after a metal mask is adhered to the blank for coining punch 21, a milling treatment is performed by using an ion-milling apparatus; then, the blank is tested. At last, the metal mask is removed and the blanks is washed to obtain coning punch 21.

Figure 7:
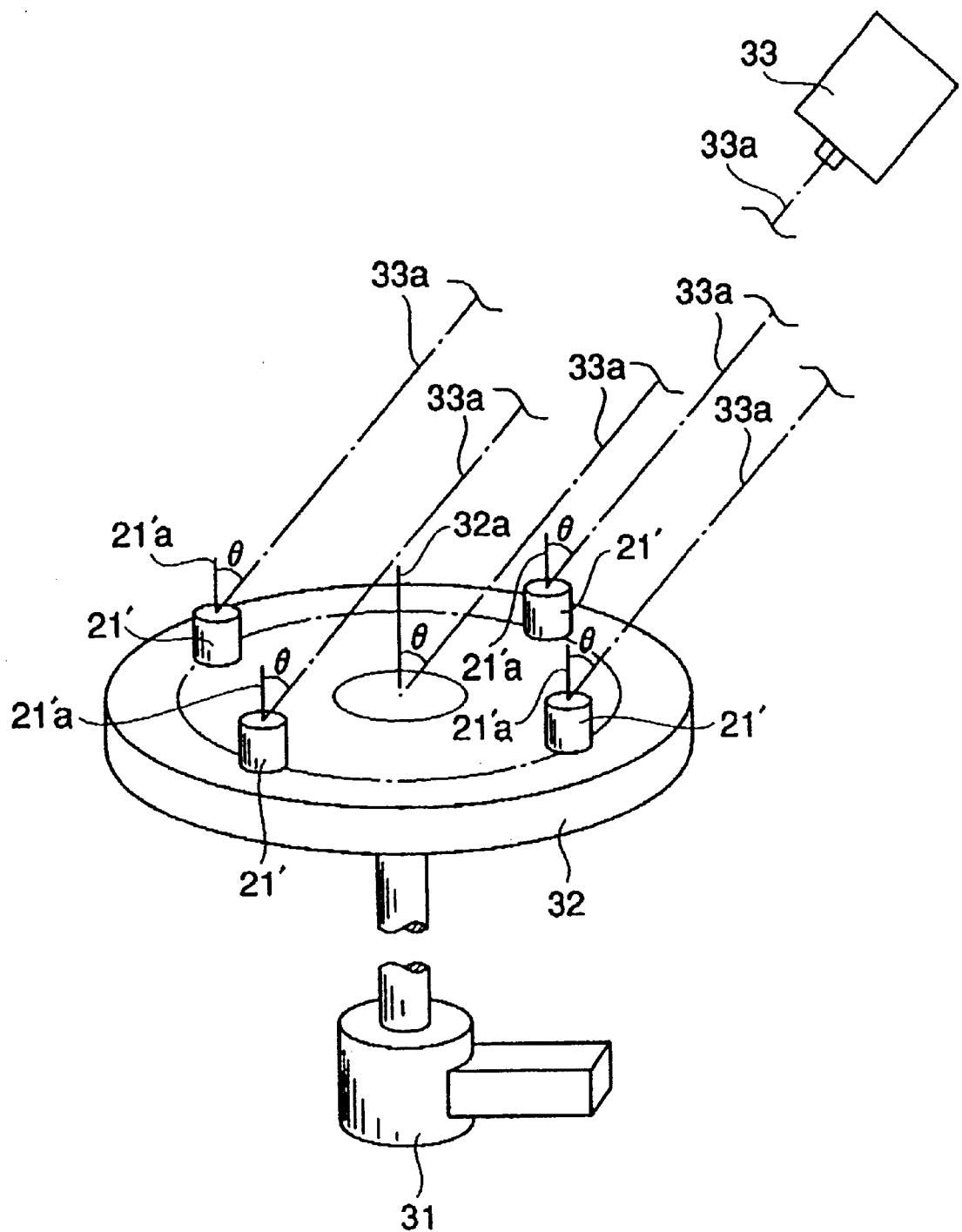
FIG. 7 is a schematic view of an apparatus for manufacturing a coining punch according to the present invention.

To perform the milling treatment, as shown in FIG. 7, a plurality of blanks 21' for coining punch 21 made of the hard metal material are placed around rotatable work table 32 connected to rotation drive 31 while an ion irradiation portion of ion-milling apparatus 33 is positioned diagonally above rotatable work table 32. Each of blanks 21' on rotatable work table 32 is fixed thereto with its surface to form coining punch 21 in the approximately upward direction; ion irradiation axis 33a is directed to form a given angle θ in relation to rotational axis 32a of rotatable work table 32, which extends in the approximately vertical direction, within a range of 5 to 85 In other words, a first direction, perpendicular to the end surface of blank 21', and a second direction, as a direction of ion irradiation of ion-milling apparatus 33, forms a given angle θ. In this case, the angle between center 21'a of blanks 21' and the direction of ion irradiation axis 33a of ion-milling apparatus 33 is established to be θ.

Figure 8:
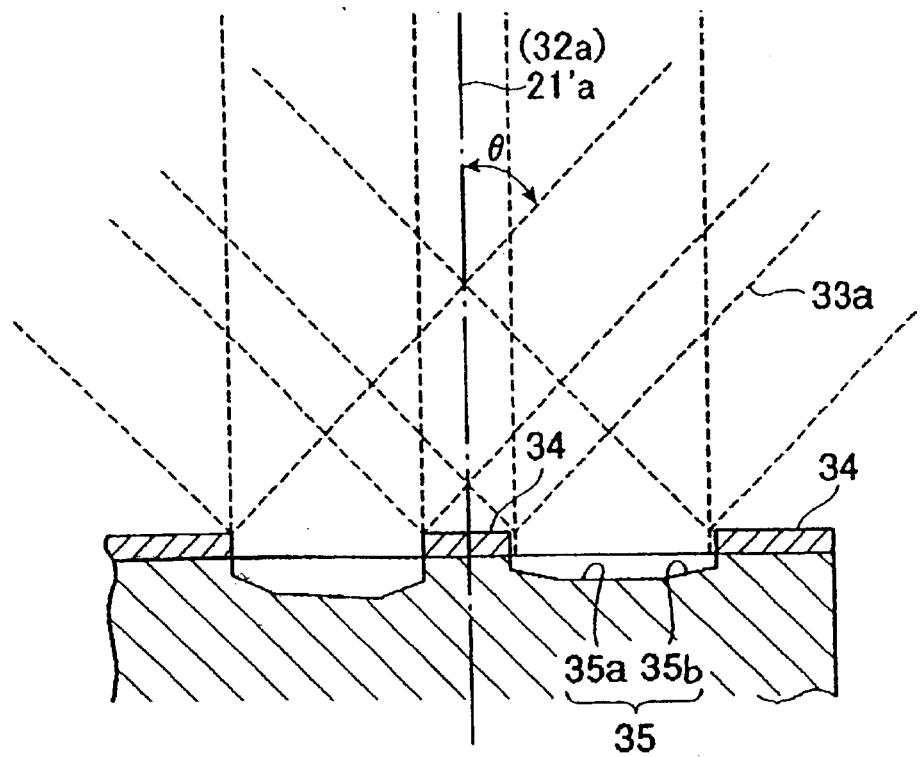
FIG. 8 is an enlarged longitudinal section of a blank for a coining punch manufactured by the apparatus of FIG. 7.

As shown enlarged in FIG. 8, metal mask 34 is mounted at a section of the end surface of blank 21' (towards the top of the figure) corresponding to dynamic pressure generating groove 11 such that this section corresponding to dynamic pressure generating groove 11 is protected from ion irradiation from ion-milling apparatus 33. Metal mask 34 is made of a thin stainless steel and the like wherein a pattern corresponding to dynamic pressure generating groove 11 is formed by etching and the like. Also, the metal mask is firmly adhered to the end surface of blank 21' (towards the top of the figure) by using a heat-resistant adhesive such as an epoxy resin. By adhering metal mask 34 to blank 21' using an adhesive, one can prevent floating and stripping literal translations due to warping of the metal mask caused when it is magnetically fixed, for example. As a result, the pattern on metal mask 34 is accurately transferred to coining blank 21'.

Metal mask 34 is, together with blank 21', gradually thinned due to the milling treatment by ion irradiation from ion-milling apparatus 33; the thickness of metal mask 34 should be thick enough such that metal mask 34 still exists at the end of the process. In other words, the thickness of such a metal mask 34 can be more even than masks formed by pressing a resin and a resist; as a result, precision of the milling treatment, described in the following, can be improved.

A concave portion for forming a projecting surface is formed by ion irradiation from ion-milling apparatus 33 onto the end surface of blank 21' (towards the top of the figure) while rotating rotatable work table 32 having the described above angles. In this case, center 21'*a* of blank 21' and ion irradiation axis 33*a* of ion-milling apparatus 33 maintains a given angle. Also, blank 21' can be fixed while ion irradiation axis 33*a* of ion-milling apparatus 33 is rotated.

As performing ion irradiation to the end surface of blank 21' (towards the top of the figure) while the positional relationship between blank 21' and ion-milling apparatus 33 is maintained constant, milling treatment is not performed on the section covered by metal mask 34 (only metal mask 34 is treated). A concave portion for forming a projecting surface is formed as a groove on the section 35 not protected from ion irradiation by metal mask 34 by the milling treatment. As mentioned above, ion-milling apparatus 33 and blank 21' maintains a constant positional relationship; therefore, the depth of the formed groove may be varied.

In other words, the depth of the groove becomes the deepest at section 35*a* to which ion irradiation is constantly applied without metal mask 34. Section 35*a*, with a deep groove, lays for a given range to configure the bottom of the groove.

On the other hand, as blank 21' is rotated while ion milling apparatus 33 is positioned with an angle, ion irradiation onto section 35*b*, which is temporarily shadowed by metal mask 34, is interrupted for a period of time; as a result, the depth of the groove thereat corresponds to the length of ion irradiation thereon. In other words, section 35*b*, which is interrupted from ion irradiation for a period of time by metal mask 34, is interrupted from ion irradiation for a longer period of time as it comes closer to metal mask 34. As ion irradiation is interrupted for most of the time at the area right at the bottom of metal mask 34, the depth of the groove becomes extremely shallow. In other words, at the section away from the bottom of metal mask 34, the length of interruption of ion irradiation by metal mask 34 becomes shorter while the length of ion irradiation becomes longer, respectively. As a result, the depth of the groove at section 35*b* gradually becomes deeper towards the center starting from the bottom of metal mask 34. The depth of the groove can be sufficiently adjusted by adjusting the angle between blank 21' and ion milling apparatus 33; therefore, the concave portion of coining punch 21 can be readily shaped for a desired shape.

Coining punch 21 formed by the above ion milling apparatus 33 results in extraordinarily improved flatness on its surface, compared to the ones formed by etching and the like. Hence, the accuracy of the thrust dynamic pressure bearing surface is improved, resulting in improvement of the dynamic pressure characteristics.

Figure 9:
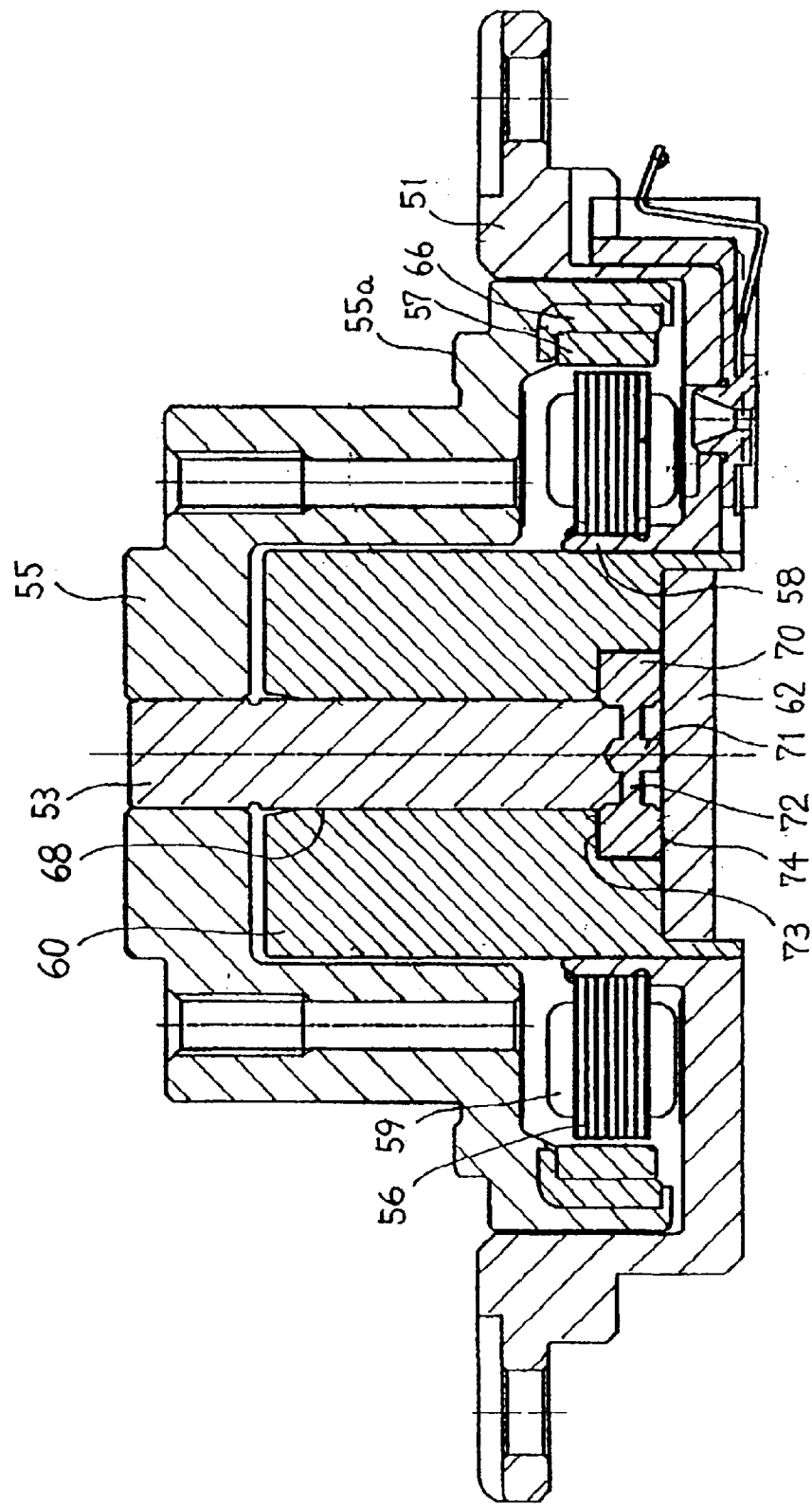
FIG. 9 is a longitudinal section showing an example of a spindle motor having a dynamic pressure bearing apparatus according to the present invention.

FIG. 9 is a cross section of a spindle motor with a rotatable shaft comprising a dynamic pressure bearing apparatus of another embodiment according to the present invention. Members herein sharing the same functions with ones in spindle motor 50 of FIG. 1 are indicated by identical symbols, and their description will be omitted. In FIG. 9, thrust plate 70, made of a resin, is integrally formed at the bottom end of rotatable shaft 53 by insert formation. Shaft 53 is inserted into a center hole of bearing member 60. Also, hub 55, to hold a disc, is press-fitted to the top end of rotatable shaft 53, which is projecting out from bearing 60. Hub 55 and shaft 53 can be integrally formed. In this embodiment, a rotatable member includes hub 55, shaft 53 and thrust plate 70 while a fixed member includes bearing 60.

Radial dynamic pressure bearing 68 is formed between rotatable shaft 53 and bearing 60; rotatable shaft 53 is rotatably held by bearing 60 by the dynamic pressure effect of dynamic pressure bearing 68. The opening at the bottom end of bearing 60 is covered with counter plate 62 to seal the opening of bearing 60. Also, lower thrust dynamic pressure bearing 74 is formed between the bottom surface of thrust plate 70 and the top surface of counter plate 62 while upper thrust dynamic pressure bearing 73 is formed between the top surface of thrust plate 70 and the surface of bearing 60 opposing the thrust plate. The thrust load of the rotatable member is supported by thrust dynamic pressure bearings 73, 74.

Cylinder 58 of frame 51 is fixed on the outer surface at the bottom of bearing 60 by press-fitting and the like. Also, laminated core 59 is mounted on the outer surface of cylinder 58; laminated core 59 comprises a given number of salient poles around which driving coil 56 is wound. The top portion of the center hole of bearing 60 is formed with a gently slanted surface such that the area between the outer surface of rotatable shaft 53 and the inner surface at the top of bearing 60 is a meniscus portion wherein the distance therein gradually becomes larger towards the top. A slight gap connects the meniscus portion, radial dynamic pressure bearing 68, and thrust dynamic pressure bearings 73, 74 and is filled with a lubricating fluid, such as oil and the like. Therefore, when rotatable shaft 53 rotates in relation to bearing 60, dynamic pressure is generated in the lubricating fluid at radial dynamic pressure bearing 68 and thrust dynamic pressure bearings 73, 74; as a result, rotatable shaft 53 and thrust plate 70 are rotatably held in the lubricating fluid without coming into contact with bearing 60 and counter plate 62.

Hub 55 is shaped as a face-down cup wherein the bottom of its outer wall covers laminated core 59. Cylindrical rotor magnet 57 is fixed to the inner surface of hub 55 via cylindrical yoke 66. The inner surface of rotor magnet 57 faces the end surface of the salient poles of laminated core 56 at a given distance. The step portion on the outside of hub 55 is disc mounting surface 55*a*; a center hole of a hard disc is engaged to the cylindrical outer surface of hub 55 as a guide to place one or a plurality of disc/discs on disc mounting surface 55*a*. The mounted discs are clamped integrally to hub 55 by a given clamping means.

The rotating position of rotor magnet 57 is detected such that the electric current to each of driving coils 59 is controlled according to the detected signals. As a result, rotor magnetic 57 is driven in the circumferential direction by the electromagnetic attraction/repulsion to rotate rotor magnet 57, and hub 55, rotatable shaft 53 and thrust plate 70 which are integrated therewith.

Figure 10A:
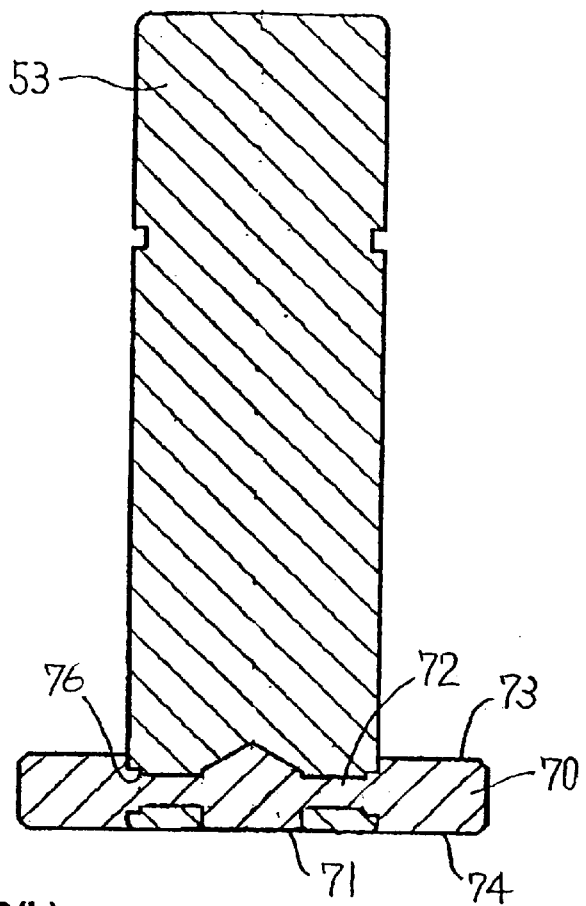
FIG. 10(*a*) is a longitudinal section and FIG. 10(*b*) is a view from the bottom of the shaft of the spindle motor of FIG. 9.
Figure 10B:
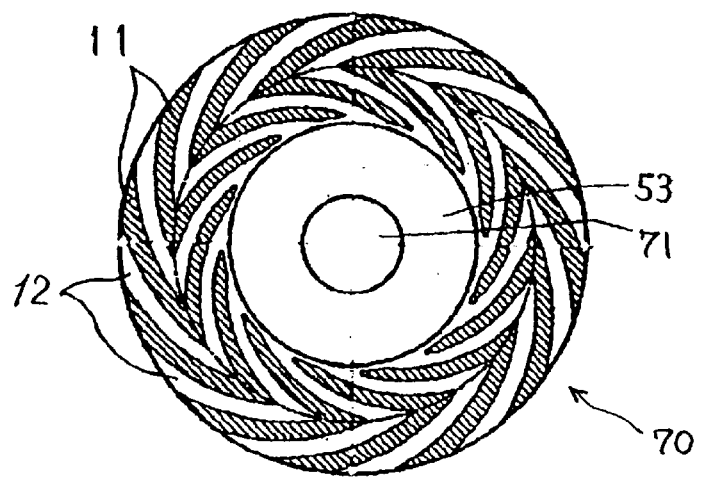
Figure 11:
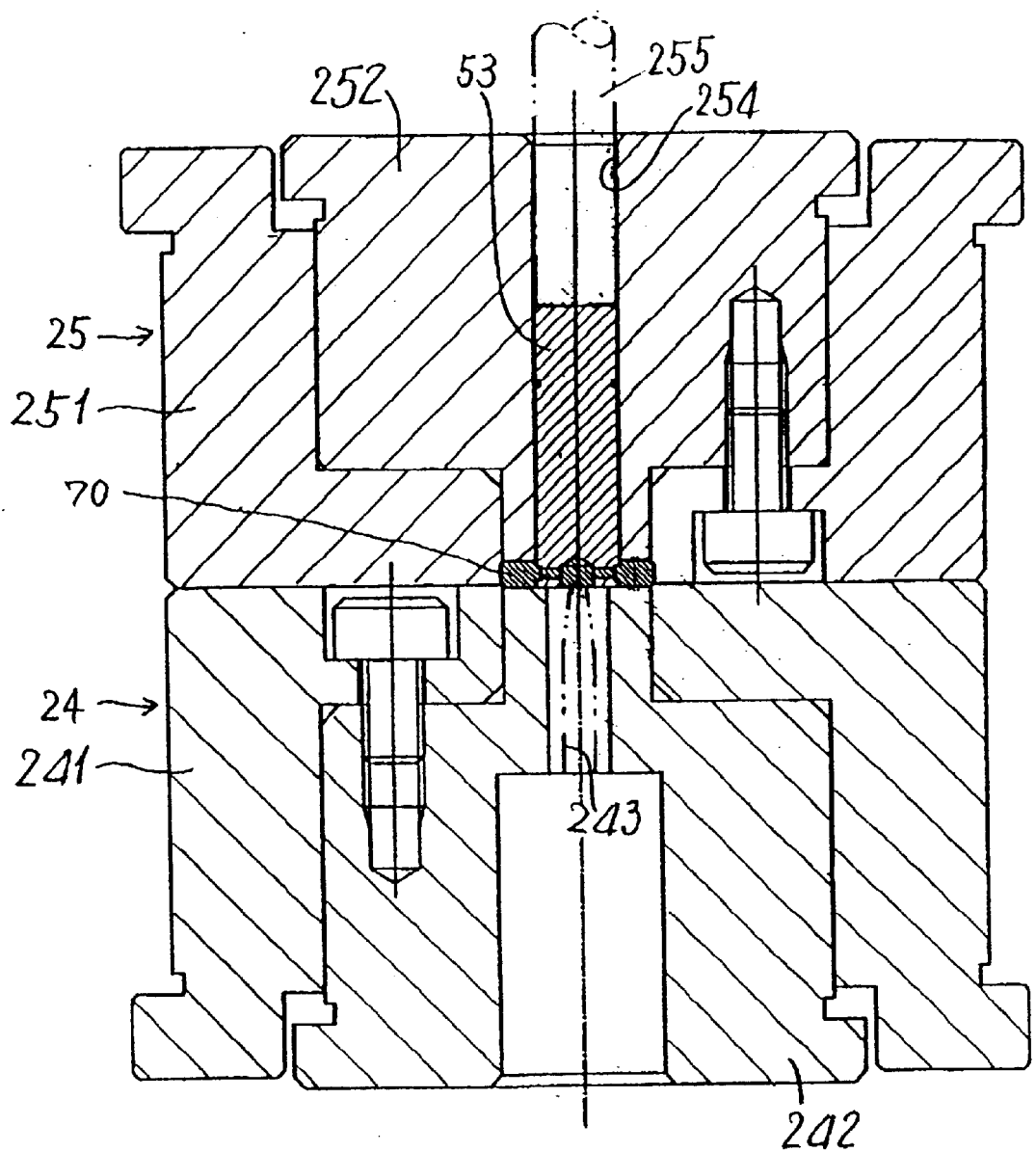
FIG. 11 is a longitudinal section showing an example of a mold for integrally forming a shaft and a thrust plate according to the present invention.

As described previously, thrust plate 70 is formed at one end of rotatable shaft 53 also, it is formed of a resin integral with rotatable shaft 53 by insert formation. FIG. 10 is a longitudinal section showing details of a configuration of rotatable shaft 53 and thrust plate 70. In FIG. 10, vertical hole 71 is formed at the bottom end of rotatable shaft 53 in the length direction to pour a resin therefrom; it becomes shallow from the bottom surface of rotatable shaft 53 towards the axial direction. Also, a plurality of horizontal hole 72 are formed from the outside surface in the radial direction; these horizontal holes 72 are connected to vertical hole 71. Circular groove 76 is formed at a section of the outer surface of rotatable shaft 53 corresponding to the position of horizontal hole 72. By pouring a resin through vertical hole 71 and horizontal holes 72 by insert formation, thrust plate 70 is integrally formed at the bottom end of rotatable shaft 53. FIG. 11 shows a mold therefor.

In FIG. 11, the mold is roughly configured of lower mold 24 and upper mold 25. Lower mold 24 comprises first lower mold 241 and second lower mold 242 which is integrated with the inside of first lower mold 241. Gate 243 is formed along the axis thereof to inject the resin. Upper mold 25 comprises first upper mold 251 and second upper mold 252 which is integrated with the inside of first upper mold 251. Hole 254 is formed at second upper mold 252 along the axis thereof; rotatable shaft 53 is inserted into hole 254. When the bottom surface of upper mold 25 is pressed against the top surface of lower mold 24, a formation space appears between the top surface of second lower mold 242 and the bottom surface second upper mold 252. Also, when rotatable shaft 53 is inserted into hole 254 with its end having vertical hole 71 and horizontal holes 72 downward, vertical hole 71 and horizontal holes 72 are placed in the formation space such that gate 243, vertical hole 71, horizontal holes 72 and the formation space are all connected to each other.

A resin is injected from gate 243 while rotatable shaft 53 is pressed by inserting log-shaped pressing member 255 into hole 254 of second upper mold 52 on the top of rotatable shaft 53; then, gate 43, vertical hole 71, horizontal holes 72 and the formation space are filled with the resin such that thrust plate 70 is integrally formed with rotatable shaft 53 of the resin by insert formation. The remains of the gate portion and a burr are found at a section of the bottom surface of rotatable shaft 53 corresponding to gate 243; these can be removed to obtain a smooth surface and do not have any impact on the precision of the dynamic pressure bearing. Also, after removing the remains of the gate portion and the burr, it is preferable to form a resin film on thrust plate 70. Circular groove 76 of rotatable shaft 53 described in reference to FIG. 10 is to prevent fall off of thrust plate 70 from rotatable shaft 53.

Returning to FIG. 10, both top and bottom surfaces 73, 74 of thrust plate 70 are thrust dynamic pressure bearing surfaces on which dynamic pressure generating grooves 11 of a given shape are formed. In other words, dynamic pressure generating grooves 11 of a given shape are formed on both thrust dynamic pressure bearing surfaces wherein the area thereof other than dynamic pressure generating grooves 11 is projecting portion 12 having a projecting surface. FIG. 10 (b) shows bottom surface 74 of thrust plate 70 wherein symbols 12 and 11a indicate a projecting portion and a dynamic pressure generating groove, respectively.

Dynamic pressure generating groove 11 is shaped such that dynamic pressure is generated by a lubricating fluid when rotatable shaft 53 and thrust plate 70 are integrally rotated in a given direction. In the example of FIG. 10, dynamic pressure generating grooves 11 are shaped as herringbones wherein a plurality of V-shaped grooves are placed in the circumferential direction. Such a shape provides an effect of increasing dynamic pressure as the lubricating fluid is gathered from both ends of dynamic pressure generating groove 11 to the summit at the center of the "V" when thrust plate 70 rotates clockwise in FIG. 10 (b). Projecting portions and dynamic pressure generating grooves similar to projecting portions 12 and dynamic pressure generating grooves 11 of bottom surface 75 are formed on top surface 73 of thrust plate 70 such that thrust dynamic pressure is generated between, top surface 73, and the opposing surface of bearing 60.

Configurations of dynamic pressure generating grooves 11 and projecting portions 12 of this embodiment have a cross section similar to the one shown in FIG. 4. In other words, the cross section of groove 11a of dynamic pressure generating groove 11 has an approximately rectangular shape wherein the opening edge of groove 11a has slanted guide surface 13. Slanted guide surface 13 is a surface connecting side wall 11b of dynamic pressure generating groove 11 and projecting surface 12a of projecting portion 12. Hence, the opening of dynamic pressure generating groove 11 expands outward (towards the top in the figure) by slanted guide surface 13. The shape of the surface of the mode described in FIG. 11 for forming thrust plate 70, that is, the shape of the top surface of second lower mold 242 and the bottom surface of second upper mold 252 should be formed to have projections and concavities to correspond to the configuration of dynamic pressure generating groove 11, projecting portion 12 and slanted guide surface 13.

The projecting surface of projecting portion 12 of lower thrust dynamic pressure bearing 74 of thrust plate 70 shaped as above comes into contact with an opposing member (counter plate 62 in FIG. 9) when it is not rotated wherein wedge-shaped space is formed between the contacting surface of the opposing member and slanted guide surface 13. Therefore, the lubricating fluid, pooled in dynamic pressure generating grooves 11 when rotation is suspended, flows out to projecting portion 12 via slanted guide surface 13 formed at the opening edge of dynamic pressure generating groove 11 as soon as rotatable shaft 53 and thrust plate are integrally rotated. Then, the lubricating fluid swiftly flows between rotatable shaft 53 and bearing 60 by the wedge effect of slanted guide surface 13 to form a film. As a result, the contact between rotatable shaft 53 and bearing 60 is prevented as soon as rotation starts such that abrasion therein can be minimized.

Figure 12:
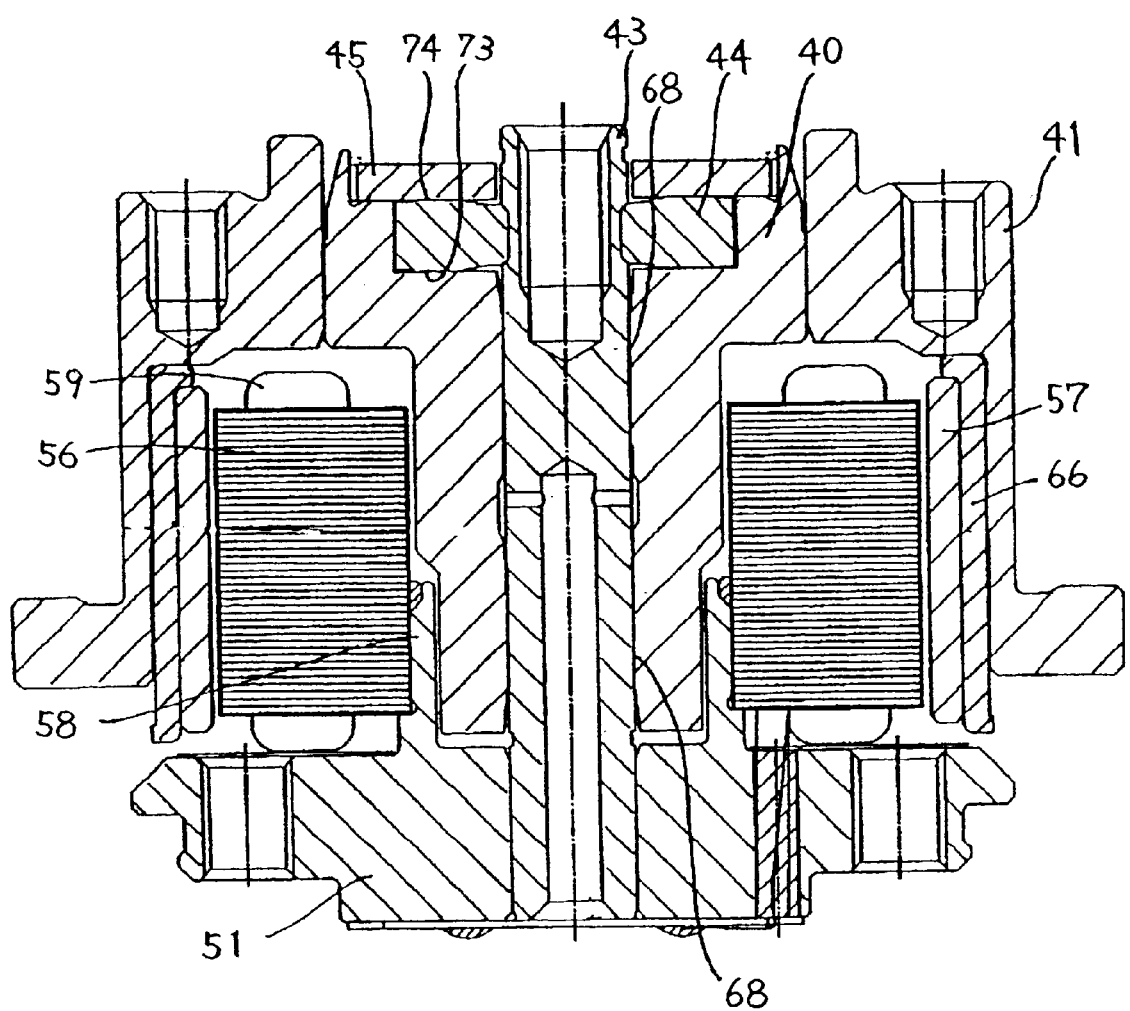
FIG. 12 is a longitudinal section showing another example showing a spindle motor having a dynamic pressure bearing apparatus according to the present invention.

The following describes yet another embodiment of a dynamic pressure bearing apparatus according to the present invention, which is adopted to a spindle motor with a fixed shaft, in reference to FIG. 12. Any parts shared with the spindle motor of FIG. 9 are indicated by identical symbols, and repeating description will be omitted. In FIG. 12, frame 51 of the motor comprises core holding portion 58 at its center hole and its outer top surface wherein the bottom end of shaft 43 is engaged to the center hole. Core 56 is fixed to the outer surface of core holding portion 58. Also, cylindrical bearing 40 is rotatably engaged to shaft 43, standing upward from frame 51. The center hole of hub 41 is engaged to the outer surface at the top of bearing 40 to integrate bearing 40 and hub 41. Hub 41 holds a hard disc wherein hub 41 and the hard disc are integrally rotatable.

Figure 13A:
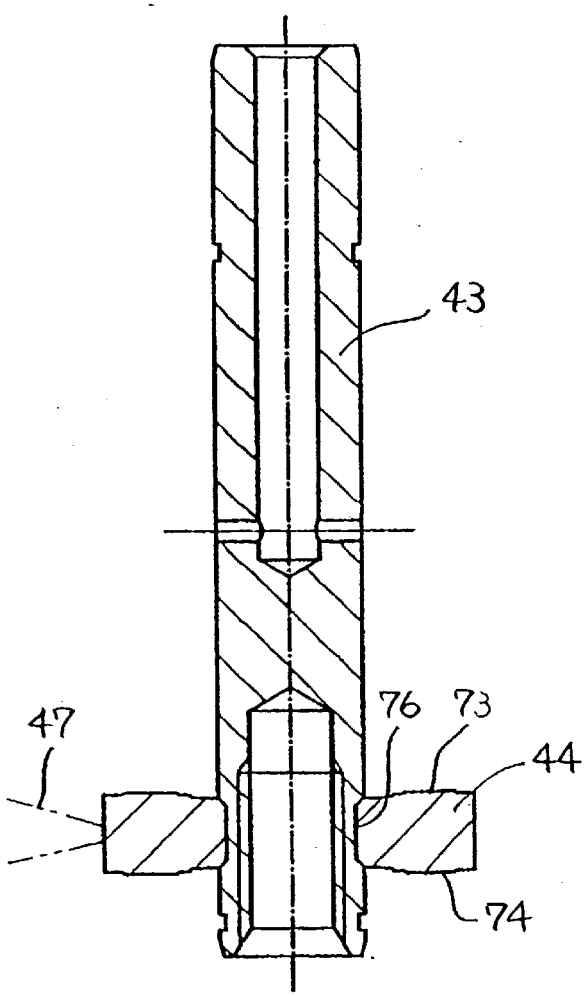
FIG. 13(a) is a longitudinal section and FIG. (b) is a view from the bottom of the shaft and thrust plate of the spindle motor of FIG. 12.
Figure 13B:
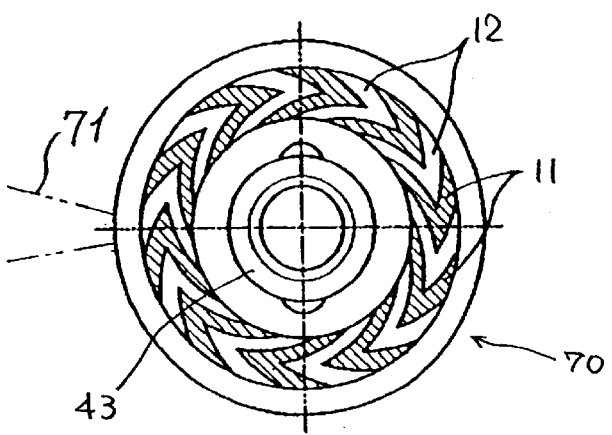

Thrust plate 44 is integrally formed of a resin on the outer surface at the top end of shaft 43 by insert formation. Also, the opening at the top end of bearing 40 is covered with counter plate 45. Opposing surfaces of counter plate 45 and thrust plate 44, and opposing surfaces of thrust plate 44 and bearing 40 are a pair of thrust dynamic pressure bearing surfaces facing each other in the axial direction. Additionally, thrust dynamic pressure bearings 74, 73 are formed at the top surface and the bottom surface of thrust plate 44, respectively. FIG. 13 (a) shows vertically reversed shaft 43 wherein thrust plate 44 is integrally formed on the outer surface of circular groove 76 with shaft 43 to prevent fall off of thrust plate 44. In this embodiment, the outer surface of shaft 43 and surfaces on both ends of thrust plate 44 in the axial direction are a part of a fixed member; a dynamic pressure bearing portion configured of these surfaces is called the first dynamic pressure bearing surface. Also, the inner surface of bearing 40, the surface of bearing 40 facing thrust plate 44 and the surface of counter plate 45 facing thrust plate 44 are a part of a rotatable member; a dynamic pressure bearing portion configured of these surfaces is called the second dynamic pressure bearing surface.

FIG. 13 (b) shows a plan view of thrust plate 44 on which dynamic pressure generating grooves 11 of a mode identical to the ones of FIG. 10 are formed. The cross section of dynamic pressure generating groove 11 is identical to the one described regarding FIG. 4 wherein slanted guide surfaces are formed on at least an edge of the opening of dynamic pressure generating groove 11, from which a lubricating fluid flows therein, to guide the lubricating fluid in dynamic pressure generating groove 11a towards projecting portion 12 by the wedge effect. The other thrust dynamic pressure bearing 74 of thrust plate 44 is similarly configured and has a similar dynamic pressure generating groove.

As bearing 40 is rotated in relation to fixed shaft 43 and thrust plate 44, dynamic pressure is generated in upper and lower thrust bearings 73, 74 of thrust plate 44 wherein bearing 40 supports the thrust load without contacting any surface by means of the thrust bearing surfaces. Also, radial dynamic pressure bearing portion 68 is formed between the inner surface of the center hole of bearing 40 and the opposing outer surface of shaft 43. As bearing 40 rotates in relation to thrust plate 44, dynamic pressure is generated in radial dynamic pressure bearing portion 68 such that bearing 40 rotates without contacting shaft 43.

Thrust plate 44 having the above configuration can be formed by using a mold. In FIG. 13, symbol 47 indicates a gate used for formation, of the thrust plate. At least one gate 47 is placed on the outer surface of thrust plate 44. The remains of a gate portion or a burr, which are formed at gate 47 during formation, are removed after the formation process. After the removal, it is preferable to form a resin film on thrust plate 44.

Figure 14:
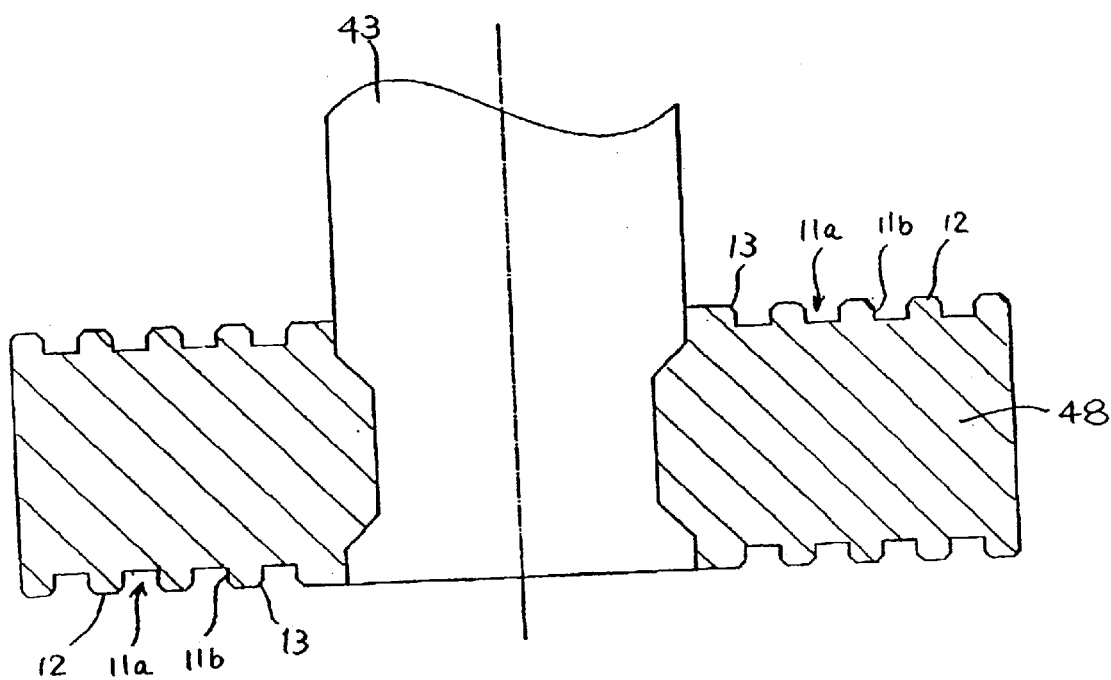
FIG. 14 is an enlarged and cross-sectioned partial front view of another example of a shaft and a thrust plate applicable to the present invention.

FIG. 14 shows another example of thrust plate 48 which is integrally formed with shaft 43. A configuration of a thrust dynamic pressure bearing surface formed on thrust plate 48 is substantially identical to the one of FIG. 4 wherein slanted guide surfaces 13 are formed on edges of the opening of dynamic pressure generating groove 11, consisting of an edge, from which a lubricating fluid flows during rotation of thrust plate 48, and the opposing edge. Slanted guide surface 13 is a connecting surface between side wall 11b of dynamic pressure generating groove 11 and projecting surface of projecting portion 12. The projecting surface of projecting portion 12 on thrust plate 48 comes into contact with an opposing member when rotation is suspended wherein a wedge-shaped space is formed between a contacting surface of the opposing member and slanted guide surface 13. Therefore, the lubricating fluid, pooled in dynamic pressure generating groove 11 while rotation is suspended, flows out to projecting portion 12 via slanted guide surface 13 formed at the opening edge of dynamic pressure generating groove 11 as soon as shaft 43 and thrust plate 48 are integrally rotated. Then, the lubricating fluid swiftly flows between shaft 43 and the opposing member by the wedge effect of slanted guide surface 13 to form a film. Slanted guide surface 13 can be formed on at least one of the edges of the opening of dynamic pressure generating groove 11, which is on the downstream of the lubricating fluid during rotation.

Figure 15:
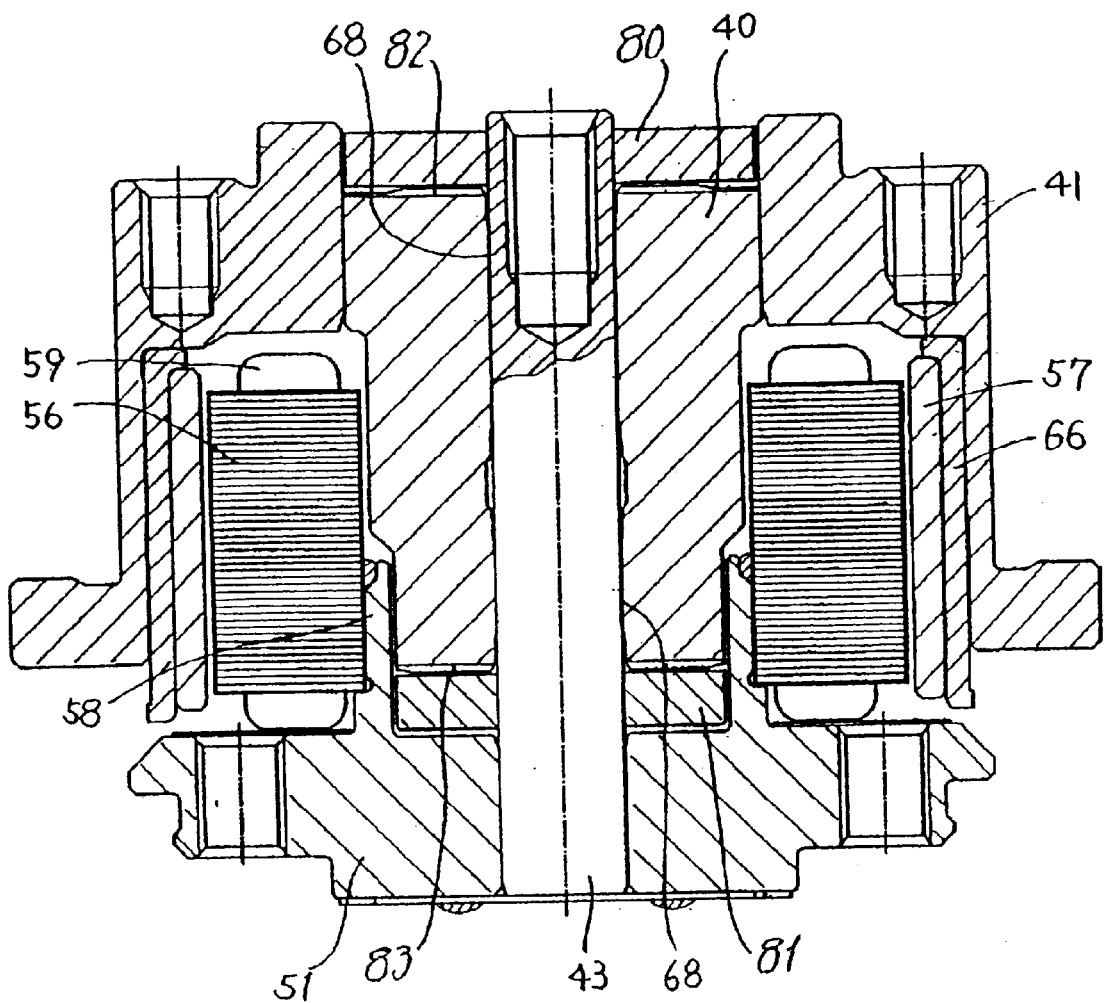
FIG. 15 is a longitudinal section showing yet another example of a spindle motor having a dynamic pressure bearing apparatus according to the present invention.

The following describes another embodiment of the present invention in reference to drawings. This embodiment is a spindle motor with a fixed shaft as a modification of the embodiment of FIG. 12. Common parts will be indicated by identical symbols while description will be focused on different parts thereof. In FIG. 15: 43 is a fixed shaft; 41 is a hub; 40 is a bearing; 57 is a rotor magnet; 51 is a frame; 66 is a yoke; 56 is a laminated core; 59 is a driving coil; and 58 is a core holding portion. Thrust plate 80 is integrally formed at the top end of shaft 43 by insert formation using a resin. Also, thrust plate 81 is integrally formed at a position towards the bottom of shaft 43 by insert formation using a resin. Upper thrust dynamic pressure bearing 82 is formed between the bottom surface of thrust plate 80 and top surface of bearing 40 while lower thrust dynamic pressure bearing 83 is formed between the bottom surface of bearing 40 and the top surface of thrust plate 81. Also, radial dynamic pressure bearing 68 is formed between the outer surface of shaft 43 and the inner surface of bearing 40. A lubricating fluid fills radial dynamic pressure bearing 68 and upper and lower thrust dynamic pressure bearings 82, 83.

Thrust dynamic pressure surfaces of thrust plates 80, 81 in the embodiment of FIG. 15 have dynamic pressure generating grooves described in relation to FIGS. 4, 10 and 13. When shaft 43 and bearing 40 are integrally rotated, dynamic pressure is generated in thrust dynamic pressure bearings 82, 83 such that bearing 40 rotates without contacting thrust plates 80, 81. Also, thrust plates 80, 81 can be formed integrally at shaft 43 by insert formation using a mold as described previously.

Figure 16:
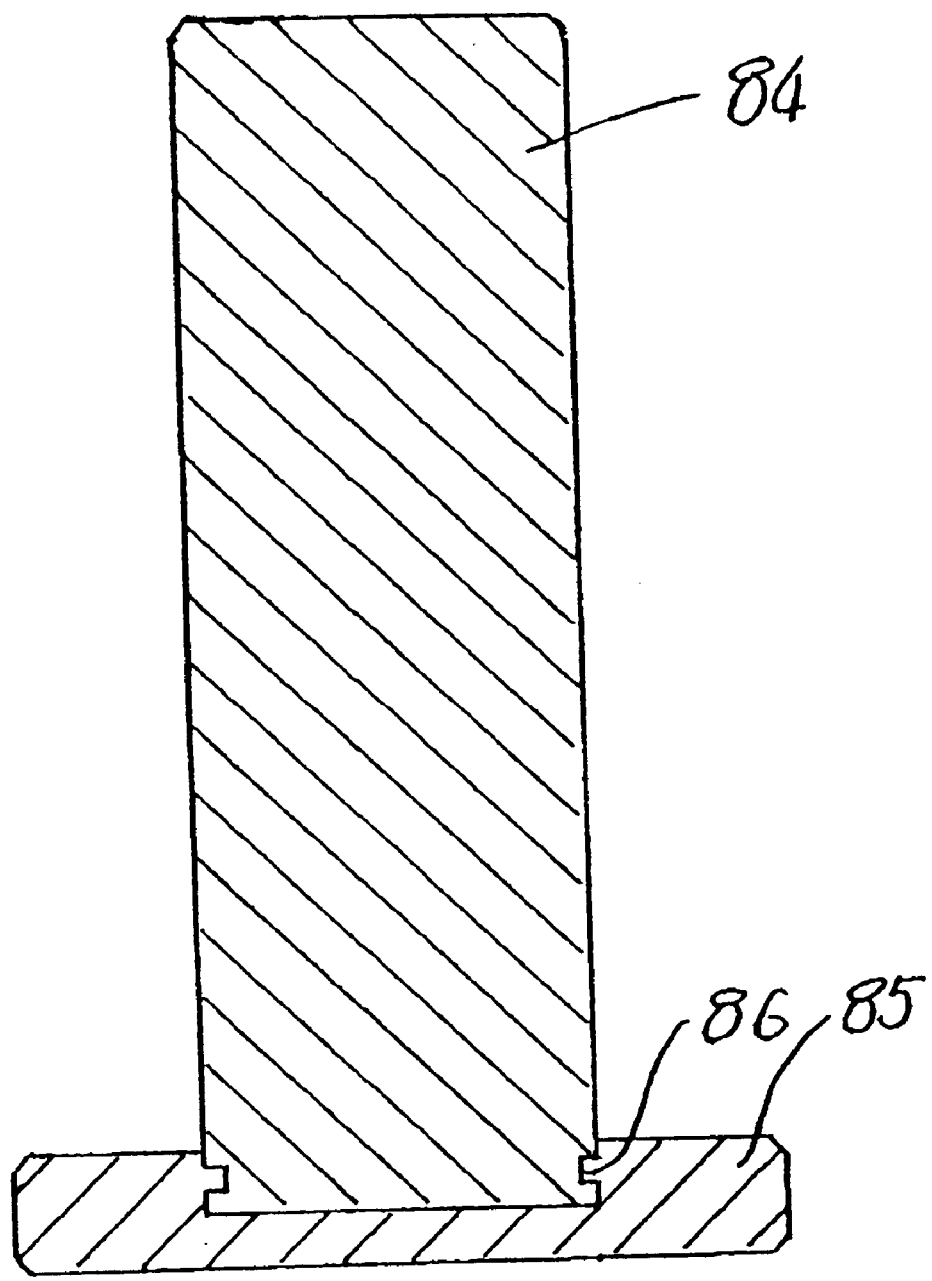
FIG. 16 is a longitudinal section showing yet another example of a shaft and a thrust plate applicable to the present invention.
Figure 17:
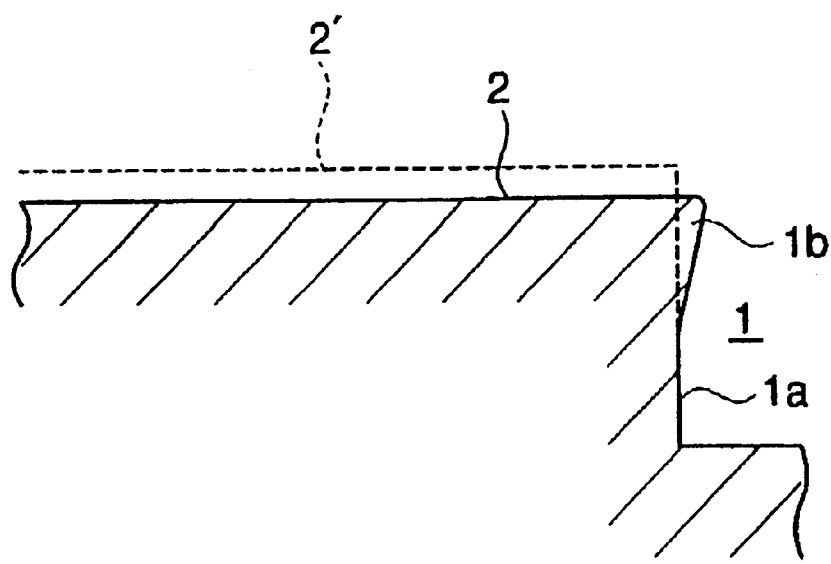
FIG. 17 is an enlarged partial cross section of a known dynamic pressure generating groove.

A thrust plate, to be formed integrally with the shaft using a resin, can be formed such that it covers the entire end surface of the shaft. FIG. 16 shows such an example. In FIG. 16, circular groove 86 is formed on the outer surface at the bottom end of shaft 84 wherein thrust plate 85 is integrally formed at the bottom surface of shaft 84 by insert formation using a resin. As the resin forming thrust plate 85 fills circular groove 86 as well as covering it, fall off of thrust plate 85 therefrom is prevented. Shaft 84 configured above is, for example, applicable as a shaft in a motor of FIG. 1.

A mold used for manufacturing a dynamic pressure bearing apparatus shown in FIG. 11, especially, a portion forming a thrust bearing surface of a thrust plate can be manufactured by an ion-milling apparatus shown in FIG. 7, for example. As a method for manufacturing thereof is identical to the embodiment of FIG. 7, any description is omitted herein.

A mold formed by ion-milling apparatus 33 has a surface with dramatically improved smoothness; as a result, the surface precision of thrust dynamic pressure surfaces is also improved, resulting in improvement of the dynamic pressure characteristics.

The above described embodiments of the present invention in detail. However, the present invention is not limited to the above embodiments; various modifications are applicable within the scope of the invention.

For example, a hard iron alloy and the like can be employed as a material for a coining punch.

Also, the above embodiments described examples of the present invention applied to a dynamic pressure bearing motor with a rotatable shaft; however, it can be a dynamic pressure bearing motor with a fixed shaft. In this case, a thrust plate is engaged to a fixed shaft wherein a cylindrical bearing rotates around the fixed shaft. Additionally, a dynamic pressure generating groove portion is formed on at least one of end surfaces of the thrust plate in the axial direction and the end surface of the shaft opposing the end surface of the thrust plate in the axial direction.

Moreover, the above embodiments showed examples of the present invention applied to a thrust dynamic pressure bearing; however, it can be a radial dynamic pressure bearing. In this case, one does not perform a flattening process to improve flatness of a projecting surface of a dynamic pressure generating groove portion.

As described above, the present invention provides the following configuration. Slanted guide surfaces (bevel surfaces) are formed at edges of the opening of a dynamic pressure generating groove. As a result, a lubricating fluid, which is pooled in the dynamic pressure generating groove while rotation is suspended, flows out into the gap over the projecting portions via the slanted guide surface as soon as rotation starts. Accordingly, a fixed member and a rotatable member are held, without contacting each other, by the floating power due to the wedge effect of the slanted guide surface. Hence, contact between the fixed member and the rotatable member is avoided from the beginning of rotation such that abrasion between the members can be minimized, resulting in extended life of the dynamic pressure bearing apparatus accompanied with improved reliability.

Also, in a method for manufacturing a coining punch according to the present invention, ion irradiation is performed to a blank for a coining punch while positioning an ion-milling apparatus at an angle. As a result, an end portion of a coining punch is efficiently formed with high precision.

What is claimed is:

1. A method for manufacturing a tool for forming dynamic pressure generating grooves used in a method for manufacturing a dynamic pressure bearing apparatus in which:

an ion-milling apparatus is placed across from a blank for a tool for forming dynamic pressure generating grooves wherein said tool is made of a coining punch or a mold; and a concave portion for forming a projecting portion on a thrust dynamic pressure bearing surface is formed for a given depth on said blank for a tool for forming dynamic pressure generating grooves by ion irradiation from said ion-milling apparatus;

wherein:

a first direction, which is perpendicular to said end surface of said blank, and a second direction, which is equal to the direction of ion irradiation from said ion-milling apparatus, are directed to form a given angle;

said ion irradiation is performed when one of said first and second directions is rotated around another direction as an axis while maintaining said angle between said directions such that a slanted surface, in which the depth becomes continuously shallow starting from the center of said concave portion for forming a projecting portion towards a side wall, is formed at a position on said blank corresponding to a bottom corner of said concave portion for forming a projecting portion; and the given angle between the first and second directions acts to intermittently irradiate a part of the concave portion during rotation to form the slanted surface.

2. A method for manufacturing a tool for forming dynamic pressure generating grooves used in a method for manufacturing a dynamic pressure bearing apparatus according to claim 1 in which said metal mask is adhered to said blank by an adhesive.

3. A method for manufacturing a tool that is used to form dynamic pressure generating grooves in dynamic pressure bearing devices, the method comprising:

placing a mask on a surface of a blank for a tool;

rotating the tool blank with respect to an ion milling apparatus;

applying ion irradiation from the ion milling apparatus to the surface of the rotating tool blank at a predetermined angle to form a concave portion having a flat bottom surface and a slanted surface, wherein the predetermined angle is formed by a perpendicular direction and an irradiation direction, the perpendicular direction being perpendicular to the surface of the tool blank and the irradiation direction being equal to the direction of ion irradiation from the ion-milling apparatus;

wherein during rotation of the tool blank, the predetermined angle and the mask act together to continuously irradiate a bottom portion to form the flat bottom surface and intermittently irradiate a part of the concave portion during rotation to form a the slanted surface at the bottom corner of the concave portion.

4. The method according to claim 3 wherein the step of placing a mask includes adhering the mask to the tool blank by an adhesive.

5. The method according to claim 3 wherein:

the bottom surface of the concave portion is a flat surface parallel to the surface of the tool blank; and the slanted surface has a depth that becomes continuously shallow starting from the bottom surface towards the side wall of the concave portion.

6. The method according to claim 3, further comprising placing on a rotatable platter a plurality of tool blanks spaced apart from each other, wherein the step of rotating includes rotating the rotatable platter.

* * * * *